(12) United States Patent
Bush et al.

(10) Patent No.: US 10,962,371 B2
(45) Date of Patent: Mar. 30, 2021

(54) METHOD AND APPARATUS OF PARALLEL TRACKING AND LOCALIZATION VIA MULTI-MODE SLAM FUSION PROCESS

(71) Applicant: GM Global Technology Operations LLC, Detroit, MI (US)

(72) Inventors: Lawrence A. Bush, Shelby Township, MI (US); Fan Bai, Ann Arbor, MI (US); Pengfei Ren, Rochester Hills, MI (US); Eric L. Raphael, Birmingham, MI (US); Mohannad Murad, Troy, MI (US); Mohammad Naserian, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

(21) Appl. No.: 16/372,788

(22) Filed: Apr. 2, 2019

(65) Prior Publication Data
US 2020/0318973 A1    Oct. 8, 2020

(51) Int. Cl.
| | |
|---|---|
| *G01C 21/16* | (2006.01) |
| *G01S 19/49* | (2010.01) |
| *G01C 21/32* | (2006.01) |
| *G06T 7/70* | (2017.01) |
| *G01S 17/86* | (2020.01) |
| *G01S 17/93* | (2020.01) |
| *G01S 17/931* | (2020.01) |

(52) U.S. Cl.
CPC ........... *G01C 21/165* (2013.01); *G01C 21/32* (2013.01); *G01S 17/86* (2020.01); *G01S 17/931* (2020.01); *G01S 19/49* (2013.01); *G06T 7/70* (2017.01); *G06T 2207/30244* (2013.01); *G06T 2207/30252* (2013.01)

(58) Field of Classification Search
CPC ....... G01C 21/165; G01C 21/32; G01S 17/86; G01S 17/931; G01S 19/49; G06T 7/70; G06T 2207/30252; G06T 2207/30244
See application file for complete search history.

(56) References Cited

U.S. PATENT DOCUMENTS

2012/0306850 A1* 12/2012 Balan .................... G06F 3/0304
                                                            345/419
2017/0242133 A1*  8/2017 Yilmaz .................. G01S 19/26

* cited by examiner

*Primary Examiner* — Rodney A Butler
(74) *Attorney, Agent, or Firm* — Quinn IP Law (57) ABSTRACT

A method for vehicle tracking and localization includes receiving, by a controller, odometry data from a sensor of the first vehicle; geospatial data from a Global Positioning System (GPS) device of the first vehicle; inertial data from an inertial measurement unit (IMU) of the first vehicle; estimating an estimated-current location of the first vehicle and an estimated-current trajectory of the first vehicle using the odometry data from the sensor, the geospatial data from the GPS device, and the inertial data from the IMU of the first vehicle; inputting the inertial data into a Bayesian Network to determine a predicted location of the first vehicle and a predicted trajectory of the first vehicle, and updating the Bayesian Network using the estimated-current location and the estimated-current trajectory of the first vehicle using the odometry data and the geospatial data.

20 Claims, 3 Drawing Sheets

METHOD AND APPARATUS OF PARALLEL TRACKING AND LOCALIZATION VIA MULTI-MODE SLAM FUSION PROCESS

INTRODUCTION

The present disclosure relates to a method and system for parallel tracking and localization via multi-mode simultaneous localization and mapping (SLAM) fusion process.

SUMMARY

The present disclosure describes a method and system for vehicle tracking and localization. By employing this method, a high-end vehicle provides a virtual localization server and provides an alternative localization process for a second vehicle through collaborative perception sharing. In some instances, the GPS device of the second vehicle could be occluded in challenging scenarios (e.g., urban canyon), preventing it from localizing itself for localization. By employing this method, the collaborative perception capability could benefit the second vehicle (which does not have a high-precision GPS). The high-end vehicle then becomes a virtual server for the second vehicle. The method also employs a new protocol for perception sharing and integrates intelligent low-lever fused camera-lidar data (RGB-XYZ).

The presently disclosed system allows a High-end vehicle equipped with High-Precision GPS, Visual SLAM, or Visual Odometry technology to provide an alternative localization method for the nearby low-end vehicles. The system fuses the inputs from different localization and perception sensor systems (High-precision GPS, IMU, Visual-Lidar Odometry (VLO)) for sub-lane-level localization. The system tracks the targeted vehicles via convolutional time-series joint measurement/state tracking (e.g., Kalman Filter, Particle Filter, or Hidden Markov Model etc.). A low-end vehicle's GPS could be occluded in challenging scenarios (e.g., urban canyon), preventing it from accurately localizing itself for localization.

Through collaborative perception sharing, a nearby High-end vehicle equipped with High-Precision GPS, Visual SLAM, or Visual Odometry technology could provide an alternative localization method for the low-end vehicle. The High-end vehicle localizes itself against a world reference system. The High-end vehicle tracks a Low-end vehicle against itself. The High-end vehicle converts low-end position into the world reference system. The benefits of the presently disclosed system and method include improving localization accuracy and reducing the localization error in challenging environments.

In one aspect, the method for vehicle tracking and localization includes: receiving, by a first controller of a first vehicle, odometry data from a sensor of the first vehicle; receiving, by the first controller of the first vehicle, geospatial data from a Global Positioning System (GPS) device of the first vehicle; receiving, by the first controller of the first vehicle, inertial data from an inertial measurement unit (IMU) of the first vehicle; estimating, by the first controller of the first vehicle, an estimated-current location of the first vehicle and an estimated-current trajectory of the first vehicle using the odometry data from the sensor, the geospatial data from the GPS device, and the inertial data from the IMU of the first vehicle; inputting the inertial data into a Bayesian Network to determine a predicted location of the first vehicle and a predicted trajectory of the first vehicle, wherein the Bayesian Network runs on the first controller of the first vehicle; updating the Bayesian Network using the estimated-current location and the estimated-current trajectory of the first vehicle using the odometry data and the geospatial data; detecting, by the first controller of the first vehicle, a second vehicle using the odometry data of the sensor of the first vehicle; estimating, by the first controller of the first vehicle, an estimated-current location of a second vehicle and an estimated-current trajectory of the second vehicle using the odometry data from the sensor, the geospatial data from the GPS device, and the inertial data from the IMU of the first vehicle; and transmitting the estimated-current location of the first vehicle, the estimated-current trajectory of the first vehicle, the estimated-current location of the second vehicle, and the estimated-current trajectory of the second vehicle to the second vehicle.

The method may further include extracting, by the first controller of the first vehicle, feature data from the odometry data. The feature data is data about objects and an arrangement of the objects detected by the sensor. The feature data includes a feature map that shows the arrangement of the objects sensed by the sensor. The method may further include determining, by the first controller of the first vehicle, feature mappoints using the geospatial data received from the GPS device. The feature mappoints are geospatial locations of features. The method may further include matching the feature map with the feature mappoints.

The first controller may estimate the estimated-current location of the first vehicle and the estimated-current trajectory of the first vehicle includes using a pose graph optimization process. The first controller may estimate the estimated-current location of the first vehicle and the estimated-current trajectory of the first vehicle includes using an extended Kalman filter. The controller may estimate the estimated-current location of the first vehicle and the estimated-current trajectory of the first vehicle includes using an extended Kalman filter by fusing the odometry data, the geospatial data, and the inertial data to determine the estimated-current location of the first vehicle and the estimated-current trajectory of the first vehicle.

The GPS device of the first vehicle may be referred to as a first GPS device. The geospatial data may be referred to as the first geospatial data. The second vehicle includes a second GPS device and a second controller in communication with the second GPS device. The method may further include receiving, by a second controller of the second vehicle, the estimated-current location of the first vehicle, the estimated-current trajectory of the first vehicle, the estimated-current location of the second vehicle, and the estimated-current trajectory of the second vehicle to the second vehicle from the first controller of the first vehicle.

The method may further include: receiving, by the second controller of the second vehicle, second geospatial data from the second GPS device of the second vehicle; and determining, by the second controller of the second vehicle, an updated-estimated-current location of the second vehicle using the second geospatial data from the second GPS device and the estimated-current location of the second vehicle transmitted by the first vehicle.

The method may further include determining, by the first controller of the first vehicle, semantic mappoints data from the odometry data. The sensor may be a camera configured to capture an image. The sensor may be a Lidar sensor.

The present disclosure also describes a system for tracking and localization of a first vehicle. The system may include a camera configured to capture images, wherein the camera is configured to generate odometry data. The odometry data is indicative of a position and an orientation of the first vehicle. The camera is configured to detect a second vehicle. The system includes a communication system configured to wirelessly communicate information between the first vehicle and a second vehicle. The system includes a Global Positioning System (GPS) device configured to determine a GPS-location of the first vehicle. The GPS device is configured to generate geospatial data, and the geospatial data is indicative of the GPS-location of the first vehicle. The system includes an inertial measurement unit (IMU) configured to measure an angular and linear motion of the first vehicle. The IMU is configured to generate inertial data. The inertial data is indicative of the angular and linear motion of the first vehicle. The system further includes a first controller in communication with the communication system and the camera. The first controller is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
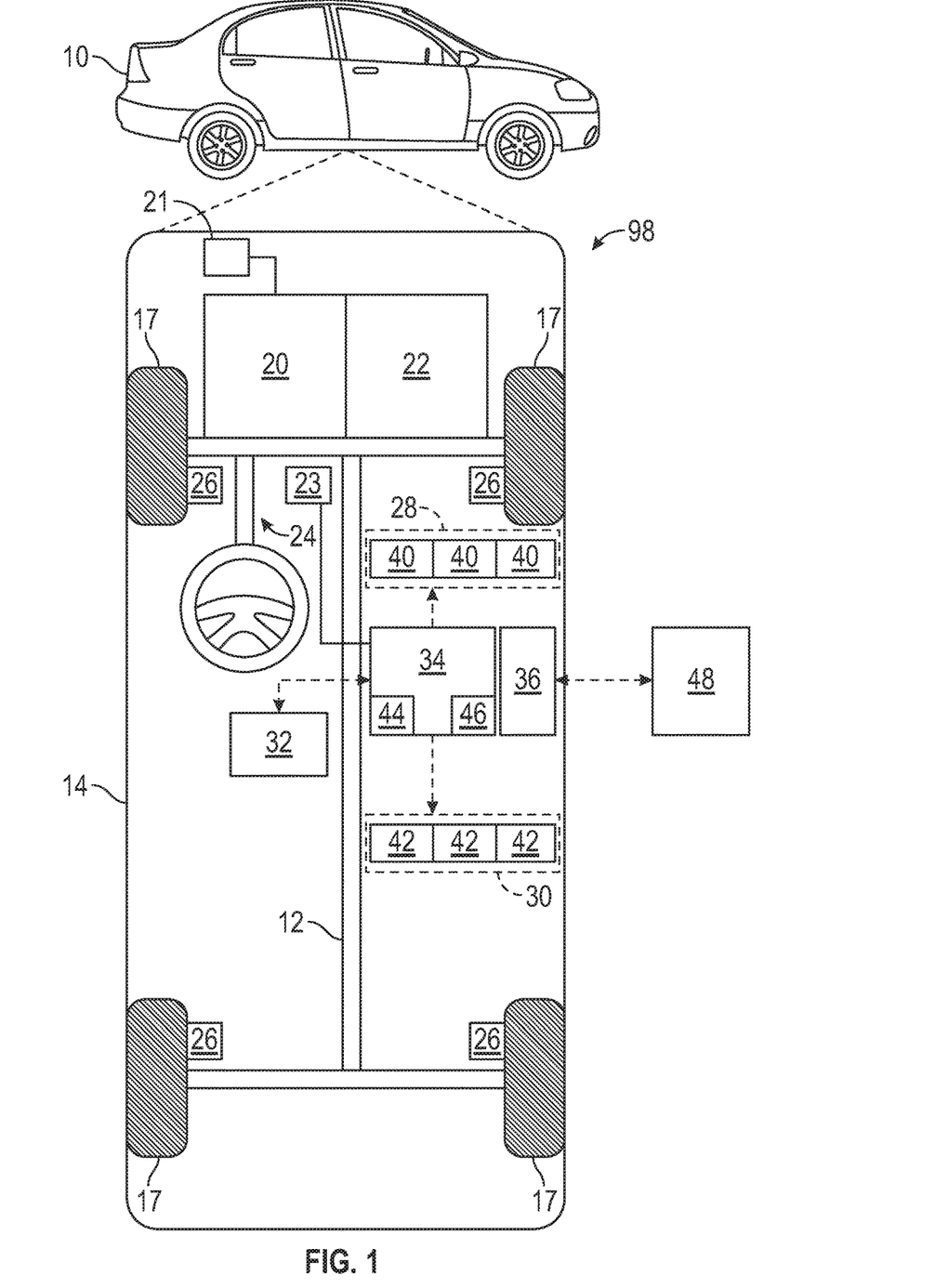
FIG. 1 is a schematic block diagram of a vehicle.

As depicted in FIG. 1, the high-end vehicle 10 generally includes a chassis 12, a body 14, front and rear wheels 17 and may be referred to as the host vehicle. The body 14 is arranged on the chassis 12 and substantially encloses components of the high-end vehicle 10. The body 14 and the chassis 12 may jointly form a frame. The wheels 17 are each rotationally coupled to the chassis 12 near a respective corner of the body 14.

In various embodiments, the high-end vehicle 10 may be an autonomous vehicle and a control system 98 is incorporated into the high-end vehicle 10. The control system 98 may be simply referred to as the system. The high-end vehicle 10 is, for example, a vehicle that is automatically controlled to carry passengers from one location to another. The high-end vehicle 10 is depicted in the illustrated embodiment as a passenger car, but it should be appreciated that other vehicles including motorcycles, trucks, sport utility vehicles (SUVs), recreational vehicles (RVs), marine vessels, aircraft, etc., can also be used. In an exemplary embodiment, the high-end vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver.

As shown, the high-end vehicle 10 generally includes a propulsion system 20, a transmission system 22, a steering system 24, a brake system 26, a sensor system 28, an actuator system 30, at least one data storage device 32, at least one controller 34, and a communication system 36. The controller 34 may be referred to as the first controller. The propulsion system 20 may, in various embodiments, include an electric machine such as a traction motor and/or a fuel cell propulsion system. The high-end vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

Figure 2:
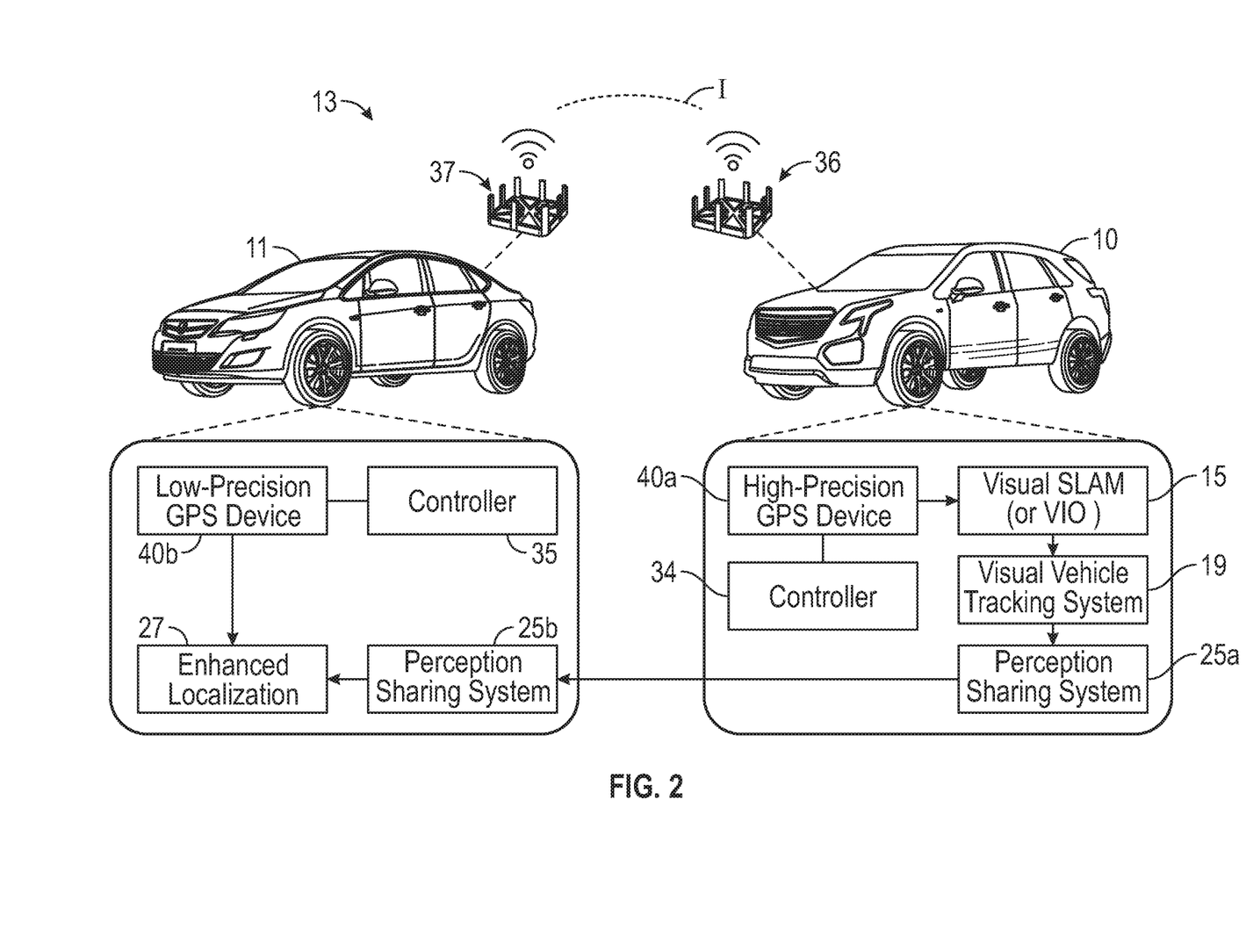
FIG. 2 is a schematic block diagram of a system for vehicle tracking and localization.

The sensor system 28 includes one or more sensors 40 (i.e., sensing devices) that sense observable conditions of the exterior environment and/or the interior environment of the high-end vehicle 10. The sensors 40 are in communication with the controller 34 and may include, but are not limited to, one or more radars, one or more light detection and ranging (lidar) sensors, one or more global positioning systems (GPS) devices, one or more cameras (e.g., optical cameras and/or thermal cameras), ultrasonic sensors, one or more inertial measurement units (IMUs) and/or other sensors. Each camera is configured to capture images and generate odometry data. The odometry data is indicative of a position and an orientation of the high-end vehicle 10. Further, the camera is configured to detect (i.e., sense) a low-end vehicle 11 (FIG. 2). Each IMU is configured to measure an angular and linear motion of the high-end vehicle 10. The IMU generates inertial data that is indicative of the angular and linear motion of the high-end vehicle 10. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensing system 24 includes one or more Global Positioning System (GPS) transceiver configured to detect and monitor the route data (i.e., route information). The GPS device is configured to communicate with a GPS to locate the position of the high-end vehicle 10 in the globe. The GPS device is in electronic communication with the controller 34. Because the sensor system 28 provides object data to the controller 34, the sensory system 28 and its sensors 40 are considered sources of information (or simply sources).

The data storage device 32 stores data for use in automatically controlling the high-end vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the high-end vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the high-end vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the high-end vehicle 10, and generate control signals to the actuator system 30 to automatically control the components of the high-end vehicle 10 based on the logic, calculations, methods, and/or algorithms. Although a single controller 34 is shown in FIG. 1, embodiments of the high-end vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the high-end vehicle 10.

In various embodiments, one or more instructions of the controller 34 are embodied in the control system 98. The high-end vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured to receive inputs from the user via the user interface 23. The user interface 23 includes a display configured to display information to the user (e.g., vehicle operator or passenger).

The communication system 36 is in communication with the controller 34 and is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system is configured to wirelessly communicate information I between the high-end vehicle 10 and a low-end vehicle 11 (FIG. 2). The low-end vehicle 11 may also have a communication system 37 identical or substantially similar to the communication system 36 of the high-end vehicle 10.

FIG. 1 is a schematic block diagram of the control system 98, which is configured to control the high-end vehicle 10. The controller 34 of the control system 98 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the high-end vehicle 10. The propulsion system 20 includes one or more propulsion actuators for controlling the propulsion of the high-end vehicle 10. For example, as discussed above, the propulsion system 20 may include an internal combustion engine and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the high-end vehicle 10. The sensor system 28 may include one or more speed sensors configured to measure the speed (or velocity) of the high-end vehicle 10. The speed sensor (i.e., one of the sensors 40) is coupled to the controller 34 and is in electronic communication with one or more wheels 17. The high-end vehicle 10 may be referred to as the first vehicle or the high-end vehicle, and the controller 34 may be referred to as the first controller 34.

FIG. 2 shows a system 13 for vehicle tracking and localization. The system 13 includes the high-end vehicle 10, which may also be referred to as the first vehicle or the high-end vehicle, and a low-end vehicle 11. The low-end vehicle 11 may be referred to as the second vehicle. The component and functioning of the high-end vehicle 10 are substantially similar to the components of the low-end vehicle 11, except for the differences described below. As discussed above, one of the sensors 40 of the high-end vehicle 10 may be a GPS device 40a. The GPS device 40a of the high-end vehicle 10 may include one or more transceivers and is configured to determine a GPS-location of the high-end vehicle 10. Further, the GPS device 40a is configured to generate geospatial data that is indicative of the GPS-location of the high-end vehicle 10. The GPS device 40a may be referred to as the high-precision GPS device. The low-end vehicle 11 also has a GPS device 40b. However, the GPS device 40a of the high-end vehicle 10 is more precise than the GPS device 40b of the low-end vehicle 11. Accordingly, the GPS device 40b of the low-end vehicle 11 may be referred to as the low-precision GPS device. The low-end vehicle 11 includes a controller 35 in communication with the GPS device 40b. The controller 35 of the low-end vehicle 11 may be referred to as the second controller. The low-end vehicle 11 further includes a visual simultaneous localization and mapping system (SLAM) or visual inertial odometry system 15 for localizing the high-end vehicle 10 and the low-end vehicle 11. The camera and the IMU (i.e., sensors 40) may be part of the visual SLAM system. The low-end vehicle 11 also includes a visual vehicle tracking system 19 for tracking the high-end vehicle 10 and the low-end vehicle 11. Further, the high-end vehicle 10 includes a perception sharing system 25a for sharing perception information with the low-end vehicle 11. The low-end vehicle 11 also includes a perception sharing system 25b for sharing perception information about the high-end vehicle 10 and/or low-end vehicle 11. The low-end vehicle 11 also includes an enhanced localization system 27 for enhancing the localization information about the high-end vehicle 10 and the low-end vehicle 11 using the geospatial data from the GPS device 40b and the information received from the high-end vehicle 10. The GPS device 40a may be referred to as the first GPS device, and the second GPS device 40b may be referred to as the second GPS device.

Figure 3:
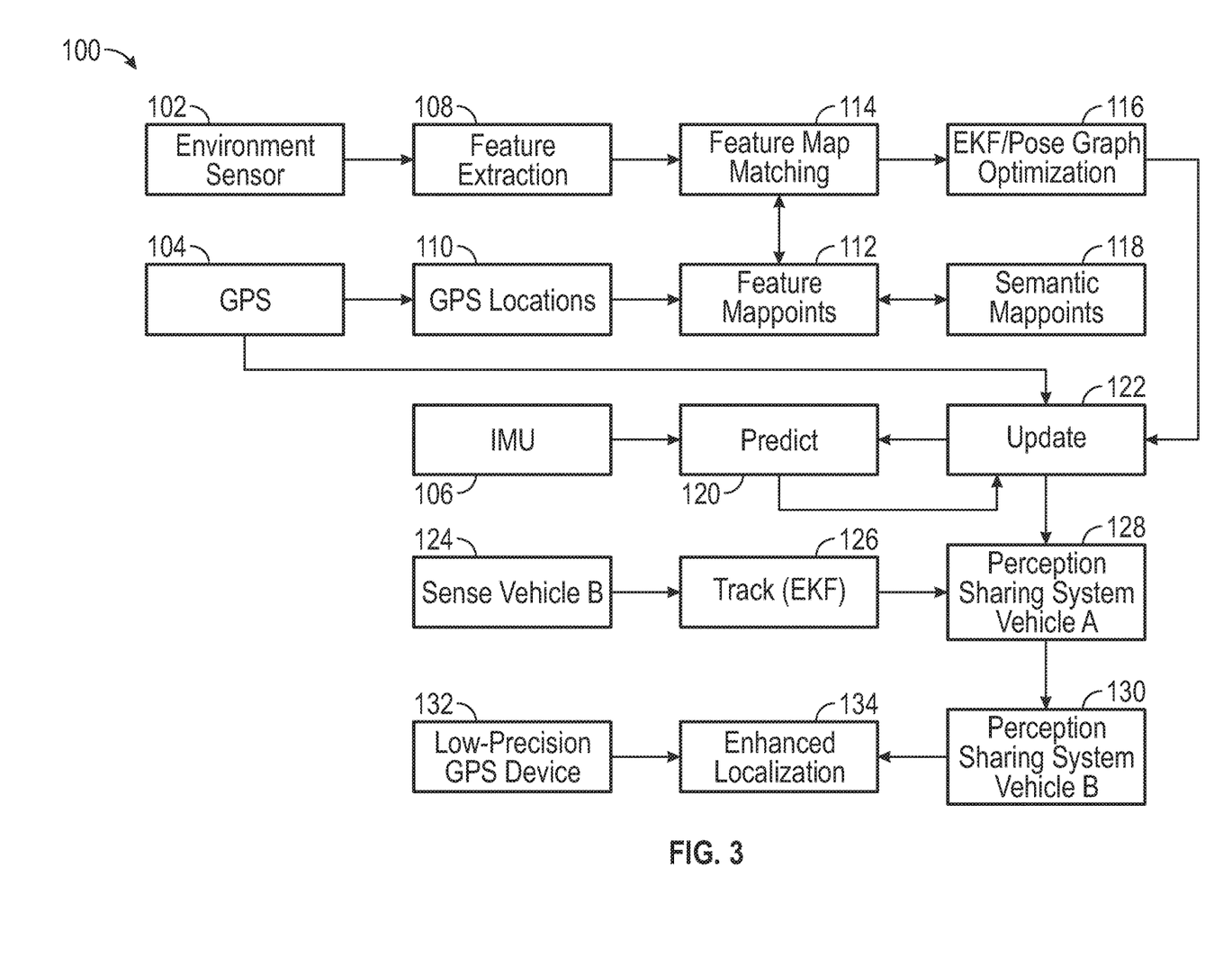
FIG. 3 is a flowchart of a method for vehicle tracking and localization.

FIG. 3 is a flowchart of a method 100 for vehicle tracking and localization. By employing this method 100, the high-end vehicle 10 provides a virtual localization server and provides an alternative localization process for the low-end vehicle 11 through collaborative perception sharing. The GPS device 40b of the low-end vehicle 11 could be occluded in challenging scenarios (e.g., urban canyon), preventing it from localizing itself for localization. By employing this method 100, the collaborative perception capability could benefit the low-end vehicle 11 (which does not have a high-precision GPS). The high-end vehicle 10 then becomes a virtual server for the low-end vehicle 11. The method 100 also employs a new protocol for perception sharing and integrates intelligent low-lever fused camera-lidar data (RGB-XYZ). The controller 34 of the high-end vehicle 10 is programmed to execute the method 100.

The method 100 for vehicle tracking and localization includes block 102. At block 102, the controller 34 receives odometry data from one or more of the sensors 40 of the high-end vehicle 10. As discussed above, the sensors 40 may sense environment conditions, such as vehicle location of the high-end vehicle 10, location of the low-end vehicle 11, detection of other objects around the high-end vehicle 10, distance between the high-end vehicle 10 and other objects (e.g., low-end vehicle 11). The term "odometry data" means data about the position and the motion of one or more objects over time. At block 102, the sensors 40 may be lidar sensor, cameras, speed sensors, accelerometers, gyroscopes, or other sensor capable of detecting the position and/or motion of one or more objects (e.g., high-end vehicle 10 and/or low-end vehicle 11) over time. Accordingly, the odometry data may be visual odometry data. The term "visual odometry data" means data about the position and motion of an object, such as the high-end vehicle 10 and/or the low-end vehicle 11, by analyzing associated camera images. The method 100 fuses visual SLAM/Visual Odometry (VO), IMU, and GPS data altogether to provide a robust, seamless map representation for accurate vehicle localization in challenging environments.

The method 100 also includes block 104. At block 104, the controller 34 receives geospatial data from the GPS device 40a of the high-end vehicle 10 (i.e., the high-precision GPS device of the high-end vehicle 10). The GPS device 40a is configured to receive terrain, map, and location data from a GPS and to generate geospatial data. The term "geospatial data" means data about the terrain, topology, and global location of the area around the high-end vehicle 10. Therefore, the geospatial data from the GPS device 40a is al least indicative of the GPS-location of the high-end vehicle 10. The term "GPS-location" means the location of objects, such as high-end vehicle 10 and/or the low-end vehicle 11, provided by a GPS.

The method 100 also includes block 106. At block 106, the controller 34 receives inertial data from the inertial measurement unit (IMU) of the high-end vehicle 10. As discussed above, the IMU is one of the sensors 40 of the high-end vehicle 10. The IMU is an electronic device that measures and reports a body's specific force, angular rate, and sometimes the magnetic field surrounding the body, using a combination of accelerometers and gyroscopes, and sometimes magnetometers. Therefore, the IMU is configured to measure the linear and angular motion of the high-end vehicle 10 and generate inertial data. The term "inertial data" means data about the linear and angular motion of the high-end vehicle 10. After block 102, the method 100 proceeds to block 108.

At block 108, the controller 34 extracts feature data from the odometry data. The term "feature data' means data about objects and an arrangement of the objects detected by the sensors 40 (e.g., camera, lidar sensors, etc.). The feature data includes a feature map that shows the arrangement of the objects sensed by the sensors 40 at block 102.

After block 104, the method 100 proceeds to block 110. At block 110, the controller 34 determines the GPS-location of objects around the high-end vehicle 10, including the high-end vehicle 10 itself and/or the low-end vehicle 11 using the geospatial data generated by the GPS device 40*a*. After block 110, the method 100 proceeds to block 112. At block 112, the controller 34 determines feature mappoints using the geospatial data received from the GPS device 40*a* and/or the GPS locations determined at block 110. The feature mappoints are geospatial locations of the features. The term "features" means objects detected by the sensors 40.

The method 100 also includes block 114. At block 114, the controller 34 of the high-end vehicle 10 matches the feature map obtained using the sensors 40 with the feature mappoints obtained using the GPS device 40*a*. After block 114, the method 100 proceeds to block 116.

At block 116, the controller 34 estimates an estimated-current location of the high-end vehicle 10 and an estimated-current trajectory of the high-end vehicle 10 using the odometry data from the sensors 40, the geospatial data from the GPS device 40*a*, and the inertial data from the IMU of the high-end vehicle 10. In other words, the controller 34 fuses the outputs of the sensors 40 at block 102, the GPS device 40*a* at block 104, and the IMU at block 106. To do so, the controller 34 may use a pose graph optimization process and/or an extended Kalman filter. Blocks 108, 110, 112, 114, 116, and 118 may be considered a SLAM process.

After block 116, the method 100 proceed to block 118. At block 118, the controller 34 determines the semantic mappoints data from the odometry data. The semantic mappoints data is data about the texture of an image captured by the camera. The method 100 also includes block 120. The controller 34 inputs the inertial data into a Bayesian Network (e.g., $G_2O$ optimization engine) to determine a predicted location of the high-end vehicle 10 and a predicted trajectory of the high-end vehicle 10. The Bayesian Network runs on the controller 34 of the high-end vehicle 10. The Bayesian Network is a probabilistic graphical model that represents a set of variables and their conditional dependencies via a directed acyclic graph. After block 120, the method 100 proceeds to block 122. At block 122, the controller 34 updates the Bayesian Network using the estimated-current location and the estimated-current trajectory of the high-end vehicle 10 using the odometry data and the geospatial data. In other words, the current position, orientation, and speed of the high-end vehicle 10 as measured by the GPS device 40*a* and the estimated-current location of the high-end vehicle 10 and the estimated-current trajectory estimated at block 116 are used to update the Bayesian Network. Blocks 120 and 122 may be considered a Bayesian Network Graph Optimization process. The method 100 leverages the IMU to provide scale estimation for the visual odometry, because the visual odometry lacks scale information. The method 100 leverages the GPS-location data to provide absolute position estimation, because the IMU and the visual odometry data are solely relative measurements. The localization problem may also be modeled as a Bayesian graph optimization problem, and solved by existing solver. By using a sliding window method, for every N frames, a nonlinear optimization may be solved by minimizing a cost function C(x):

$$C(x) = \sum_{i=1}^{I} \sum_{j \in r(i)} e_r^{i,j^T} W_r^{i,j} e_r^{i,j} + \sum_{i=1}^{I-1} e_s^{i^T} W_s^i e_s^i + \sum_{i=1}^{I} e_g^{i^T} W_g^i e_g^i$$

where:
C(x) is the cost function;
j frames belong to relevant set of frame i;
T is the transpose of a matrix (e.g., GPS error, IMU error, or Visual error) at time i;
$e_g^i$ is the GPS error;
$W_g^i$ is the weight value of the GPS error contribution;
$e_s^i$ is the IMU error;
$W_s^i$ is the weight value of the IMU error contribution;
$e_r^i$ is the visual error; and
$W_r^i$ is the weight value of the visual error contribution.

Using the sliding window and pose graph method, it is possible to form the local graph optimization problem along with time. Each local graph optimization problem may be solved by the Levenbergh-Marquardt algorithm. As discussed above, the method 100 may use lidar sensors. The high-end vehicle 10 may have a low-level fused RGB-XYZ data, providing a full color manifold in 3D space. The fusion of visual-lidar odometry (VLO), IMU, and GPS data altogether provides a robust, seamless map representation for accurate vehicle localization in challenging environments. After block 122, the method 100 proceeds to block 124.

At block 124, the controller 34 detects (i.e., senses) the low-end vehicle 11 using the odometry data of the sensor 40 of the high-end vehicle 10. The low-end vehicle 11 may be referred to as vehicle B. After block 124, the method 100 proceeds to block 126.

At block 126, the controller 34 tracks the motion and location of the low-end vehicle 11 by fusing the odometry data, the geospatial data, and the inertial data. For example, the second controller 34 may use an extended Kalman filter to fuse the odometry data, the geospatial data, and the inertial data and thereby track the low-end vehicle 11. Blocks 124 and 126 may be considered the visual vehicle tracking system 19 (FIG. 2). At block 126, the controller 34 may represent the six degrees of the 10 of the high-end vehicle 10 (vehicle A) at time as follows:

$$\begin{pmatrix} x & \alpha \\ y & \beta \\ z & \gamma \end{pmatrix} \bigg|_A^t$$

At block 126, the controller 34 may represent the six degrees of freedom of the low-end vehicle 11 (vehicle B) at time t as follows:

$$\begin{pmatrix} x & \alpha \\ y & \beta \\ z & \gamma \end{pmatrix} \bigg|_B^t$$

The distance and angle between the high-end vehicle 10 and the low-end vehicle 11 at time t may be representative as follows:

$$d(t)_{A \rightarrow B}, d(t)_{A \rightarrow B}$$

The relative position of the high-end vehicle 10 and the low-end vehicle 11 may be provided as follows:

$$\begin{bmatrix} d(t)_{A \to B} \\ \theta(t)_{A \to B} \end{bmatrix} = f \left( \left\| \begin{pmatrix} x & \alpha \\ y & \beta \\ z & \gamma \end{pmatrix}_{A,t} - \begin{pmatrix} x & \alpha \\ y & \beta \\ z & \gamma \end{pmatrix}_{B,t} \right\| \right)$$

where:
$f$ is a function of the six degrees of freedom of the vehicle and the six degrees of freedom of the low-end vehicle 11.

The observed position of the low-end vehicle 11 over time could be given as:

$$\begin{pmatrix} x \\ y \\ z \end{pmatrix}_{A,t+1} = R_{z(A)} \begin{pmatrix} x \\ y \\ z \end{pmatrix} t + \begin{pmatrix} V_x \\ V_y \\ 0 \end{pmatrix} dt$$

where:
$V_x$ is the velocity on latitude;
$V_y$ is the velocity on longitude; and
$R_{z(A)}$ is a a rotation matrix for ego vehicle's camera domain.

The controller 34 leverages the implicit Kalman Filter (IFM) to deal with the temporal error, in both system state space $S_t$ and in measurement space $m_t$. The relationship between system state $S_t$ and measurement space $m_t$ over time-domain evolution could be described as follows:

$$\begin{cases} S_{t+1} = f(S_t) + u_t \\ m_t = h(S_t) + v_t \end{cases}$$

where:
$S_{t+1}$ is the system state at time t+1;
$m_t$ is the measurement space;
$S_t$ is the system state at time t;
$f$ and $h$ are two functions;
$u_t$ is the i. d. d. Gaussian noise with covariance matrix P; and
$v_t$ is another i. d. d. Gaussion noise with covariance matrix Q.

The controller 34 could use the standard Kalman Filter solution to smoothen the motion trajectory of the tracked low-end vehicle 11. After block 126, the method 100 proceeds to block 128.

At block 128, the controller 34 commands the communication system 36 of the high-end vehicle 10 to transmit the estimated-current location of the high-end vehicle 10, the estimated-current trajectory of the high-end vehicle 10, the estimated-current location of the low-end vehicle 11, and the estimated-current trajectory of the low-end vehicle 11 to the low-end vehicle 11. This block 128 may be referred to as the perception sharing system 25a of the high-end vehicle 10. The communication system 36 communicates the estimated-current location of the high-end vehicle 10, the estimated-current trajectory of the high-end vehicle 10, the estimated-current location of the low-end vehicle 11, and the estimated-current trajectory of the low-end vehicle 11 to the low-end vehicle 11 in absolute world coordinates. Since the estimated six degrees of freedom position of the low-end vehicle 11 might have a different coordinate system from the six degrees of freedom position of the high-end vehicle 10, there are steps to transform the estimated relative coordinate system to the absolute world-reference coordinate system. In other words, localization and map matching may be provided as follows:

$$\left\| \begin{pmatrix} x_A & \alpha_A \\ y_A & \beta_A \\ z_A & \gamma_A \end{pmatrix} \middle\| B \to \begin{pmatrix} x_A \\ y_A \\ \alpha_A \end{pmatrix} \right\| B$$

$$\left\| \begin{pmatrix} x_B & \alpha_B \\ y_B & \beta_B \\ z_B & \gamma_B \end{pmatrix} \middle\| A \to \begin{pmatrix} x_B \\ y_B \\ \alpha_B \end{pmatrix} \right\| W$$

$$\left\| \begin{pmatrix} x'_A \\ y'_A \\ 1 \end{pmatrix} \middle\| A = \begin{bmatrix} \cos\alpha_B & -\sin\alpha_B & x_B \\ \sin\alpha_B & \cos\alpha_B & y_B \\ 0 & 0 & 1 \end{bmatrix} \begin{pmatrix} x_A \\ y_A \\ 1 \end{pmatrix} \right\| B$$

where:
A and B are the high-end vehicle 10 and the low-end vehicle 11, respectively;

$$\begin{pmatrix} x_A & \alpha_A \\ y_A & \beta_A \\ z_A & \gamma_A \end{pmatrix}$$

is the six degree of freedom position of the high-send vehicle 10;

$$\begin{pmatrix} x_B & \alpha_B \\ y_B & \beta_B \\ z_B & \gamma_B \end{pmatrix}$$

is the six degree of freedom position of the low-end vehicle 11; and the last equation shows how the coordinate system of the high-end vehicle 10 is translated into the coordinate system of the low-end vehicle 11.

The method 100 then proceeds to block 130. At block 130, the controller 35 of the low-end vehicle 11 receives the estimated-current location of the high-end vehicle 10, the estimated-current trajectory of the high-end vehicle 10, the estimated-current location of the low-end vehicle 11, and the estimated-current trajectory of the low-end vehicle 11 through the perception sharing system 25a and/or the communication system of the low-end vehicle 11 from the first controller 34 of the high-end vehicle 10. Then, the method 100 proceeds to block 132.

At block 132, the controller 35 receives second geospatial data from the GPS device 40b. Then, the method 100 proceeds to block 134. At block 134, the controller 35 of the low-end vehicle 11 determines an updated-estimated-current location of the low-end vehicle 11 using the second geospatial data from the second GPS device 40b and the estimated-current location of the low-end vehicle 11 transmitted by the high-end vehicle 10.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:
1. A method for vehicle tracking and localization, comprising:

receiving, by a first controller of a first vehicle, odometry data from a sensor of the first vehicle;

receiving, by the first controller of the first vehicle, geospatial data from a Global Positioning System (GPS) device of the first vehicle;

receiving, by the first controller of the first vehicle, inertial data from an inertial measurement unit (IMU) of the first vehicle;

estimating, by the first controller of the first vehicle, an estimated-current location of the first vehicle and an estimated-current trajectory of the first vehicle using the odometry data from the sensor, the geospatial data from the GPS device, and the inertial data from the IMU of the first vehicle;

inputting the inertial data into a Bayesian Network to determine a predicted location of the first vehicle and a predicted trajectory of the first vehicle, wherein the Bayesian Network runs on the first controller of the first vehicle; and updating the Bayesian Network using the estimated-current location and the estimated-current trajectory of the first vehicle using the odometry data and the geospatial data;

detecting, by the first controller of the first vehicle, a second vehicle using the odometry data of the sensor of the first vehicle;

estimating, by the first controller of the first vehicle, an estimated-current location of a second vehicle and an estimated-current trajectory of the second vehicle using the odometry data from the sensor, the geospatial data from the GPS device, and the inertial data from the IMU of the first vehicle; and transmitting the estimated-current location of the first vehicle, the estimated-current trajectory of the first vehicle, the estimated-current location of the second vehicle, and the estimated-current trajectory of the second vehicle to the second vehicle.

2. The method of claim 1, further comprising extracting, by the first controller of the first vehicle, feature data from the odometry data, wherein the feature data is data about objects and an arrangement of the objects detected by the sensor, and the feature data includes a feature map that shows the arrangement of the objects sensed by the sensor.

3. The method of claim 2, further comprising determining, by the first controller of the first vehicle, feature mappoints using the geospatial data received by from the GPS device, wherein the feature mappoints are geospatial locations of features.

4. The method of claim 3, further comprising matching the feature map with the feature mappoints.

5. The method of claim 4, wherein estimating, by the first controller of the first vehicle, the estimated-current location of the first vehicle and the estimated-current trajectory of the first vehicle includes using a pose graph optimization process.

6. The method of claim 4, wherein estimating, by the first controller of the first vehicle, the estimated-current location of the first vehicle and the estimated-current trajectory of the first vehicle includes using an extended Kalman filter.

7. The method of claim 6, estimating, by the first controller of the first vehicle, the estimated-current location of the first vehicle and the estimated-current trajectory of the first vehicle includes using an extended Kalman filter and fusing the odometry data, the geospatial data, and the inertial data to determine the estimated-current location of the first vehicle and the estimated-current trajectory of the first vehicle.

8. The method of claim 7,
wherein the GPS device of the first vehicle is a first GPS device;
the geospatial data is a first geospatial data;
the second vehicle includes a second GPS device and a second controller in communication with the second GPS device; and
the method further includes receiving, by the second controller of the second vehicle, the estimated-current location of the first vehicle, the estimated-current trajectory of the first vehicle, the estimated-current location of the second vehicle, and the estimated-current trajectory of the second vehicle to the second vehicle from the first controller of the first vehicle.

9. The method of claim 8, further comprising:
receiving, by the second controller of the second vehicle, second geospatial data from the second GPS device of the second vehicle; and
determining, by the second controller of the second vehicle, an updated-estimated-current location of the second vehicle using the second geospatial data from the second GPS device and the estimated-current location of the second vehicle transmitted by the first vehicle.

10. The method of claim 9, further comprising determining, by the first controller of the first vehicle, semantic mappoints data from the odometry data.

11. The method of claim 1, wherein the sensor is a camera configured to capture an image.

12. The method of claim 1, wherein the sensor is a lidar sensor.

13. A system for tracking and localization of a first vehicle, comprising:
a camera configured to capture images, wherein the camera is configured to generate odometry data, the odometry data is indicative of a position and an orientation of the first vehicle, and the camera is configured to detect a second vehicle;
a communication system configured to wirelessly communicate information between the first vehicle and a second vehicle;
a Global Positioning System (GPS) device configured to determine a GPS-location of the first vehicle, and the GPS device is configured to generate geospatial data, and the geospatial data is indicative of the GPS-location of the first vehicle;
an inertial measurement unit (IMU) configured to measure an angular and linear motion of the first vehicle, wherein the IMU is configured to generate inertial data, and the inertial data is indicative of the angular and linear motion of the first vehicle;
a first controller is in communication with the communication system and the camera, wherein the first controller is programmed to:
receive the odometry data from the camera of the first vehicle;
receive the geospatial data from GPS device of the first vehicle;
receive the inertial data from the inertial measurement unit (IMU) of the first vehicle;
estimate an estimated-current location of the first vehicle and an estimated-current trajectory of the first vehicle using the odometry data from the camera, the geospatial data from the GPS device, and the inertial data from the IMU of the first vehicle;
input the inertial data into a Bayesian Network to determine a predicted location of the first vehicle and a predicted trajectory of the first vehicle, wherein the Bayesian Network runs on the first controller of the first vehicle; and update the Bayesian Network using the estimated-current location and the estimated-current trajectory of the first vehicle using the odometry data and the geospatial data;

detect the second vehicle using the odometry data of the camera of the first vehicle;

estimate an estimated-current location of a second vehicle and an estimated-current trajectory of the second vehicle using the odometry data from the camera, the geospatial data from the GPS device, and the inertial data from the IMU of the first vehicle;

command the communication system to transmit the estimated-current location of the first vehicle, the estimated-current trajectory of the first vehicle, the estimated-current location of the second vehicle, and the estimated-current trajectory of the second vehicle to the second vehicle.

14. The system of claim 13, wherein the first controller is programmed to extract feature data from the odometry data, the feature data is data about objects and an arrangement of the objects detected by the camera, and the feature data includes a feature map that shows the arrangement of the objects sensed by the camera.

15. The system of claim 14, wherein the first controller is programmed to determine feature mappoints using the geospatial data received by from the GPS device, and the feature mappoints are geospatial locations of features.

16. The system of claim 15, wherein the first controller is programmed to match the feature map with the feature mappoints.

17. The system of claim 16, wherein the first controller is programmed to use a pose graph optimization process to estimate the estimated-current location of the first vehicle and the estimated-current trajectory of the first vehicle.

18. The system of claim 16, wherein the first controller is programmed to use an extended Kalman filter to estimate the estimated-current location of the first vehicle and the estimated-current trajectory of the first vehicle.

19. The system of claim 18, wherein the first controller is programmed to fuse the odometry data, the geospatial data, and the inertial data to determine the estimated-current location of the first vehicle and the estimated-current trajectory of the first vehicle.

20. The system of claim 19, further comprising a Lidar sensor.

* * * * *